L. G. CHANNELL.
NUT LOCK.
APPLICATION FILED JUNE 8, 1914.
1,140,876.
Patented May 25, 1915.
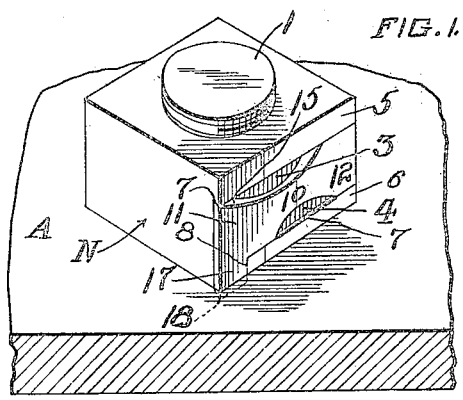
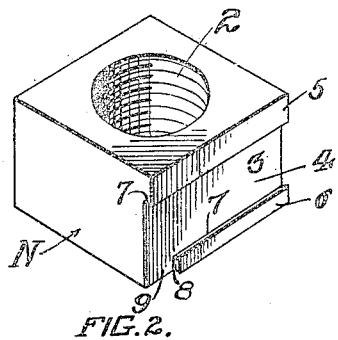
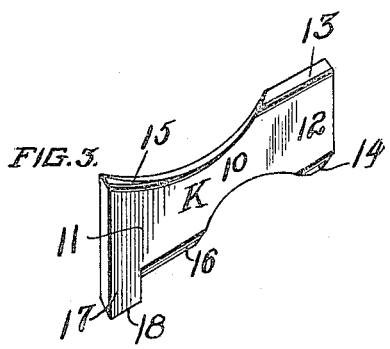
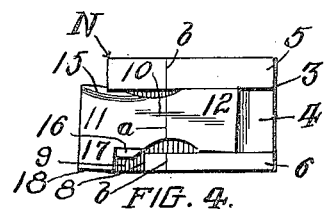
Inventor
L. G. Channell.
Witnesses

UNITED STATES PATENT OFFICE.

LEVI G. CHANNELL, OF PALESTINE, WEST VIRGINIA.

NUT-LOCK.

1,140,876.      Specification of Letters Patent.      Patented May 25, 1915.

Application filed June 8, 1914. Serial No. 843,714.

*To all whom it may concern:*

Be it known that I, LEVI G. CHANNELL, a citizen of the United States, residing at Palestine, in the county of Wirt, State of West Virginia, have invented certain new and useful Improvements in Nut-Locks; and I do hereby declare the following to be a full, clear, and exact description of the invention, such as will enable others skilled in the art to which it appertains to make and use the same.

The present invention relates to certain novel and useful improvements in nut locks.

In carrying out my invention it is my purpose to provide a simple, efficient and reliable means whereby a nut may be quickly and securely locked and held in position, so that the liability of the nut accidentally working loose from the bolt will be avoided.

A still further object of my invention is to provide a nut lock wherein a peculiar form of key is employed for locking or binding the nut against movement relative to the body, such as a beam or bar, through which the bolt carrying the nut is passed, this key when wedged home holding the nut immovable.

With the above recited objects and others of a similar nature in view, my invention consists in the construction, combination and arrangement of parts set forth in and falling within the scope of the appended claim.

In the accompanying drawings: Figure 1 is a perspective view of a nut and bolt in holding position and showing the use of my improved lock in connection therewith. Fig. 2 is a perspective view of the nut with the key removed. Fig. 3 is a perspective view of the key. Fig. 4 is a side view of the nut showing the key before it is driven home or into locking position.

Referring now to the accompanying drawings in detail, the letter A indicates conventionally a section of board, timber or other body, through which the threaded bolt shank 1 is passed. The nut, which is indicated as an entirety by the letter N is formed with the usual threaded bore 2 for allowing the nut to be threaded upon the corresponding shank of the bolt. One side, for instance the side 3, of the nut is provided with a channel 4 having the top and bottom flanges 5 and 6 respectively, these flanges being undercut or beveled as at 7 so that the channel is substantially in the form of a dove-tail slot or groove. It will be noted that the bottom flange 6 is shorter than the top flange 5, for while the latter extends entirely across the side of the nut, the flange 6 terminates short of one edge of the nut, this forming a shoulder 8 and a space 9 between the shoulder and the adjacent vertical edge of the nut.

The key for locking the nut is shown in detail in Fig. 3, and is indicated as an entirety by the letter K. As will be seen by reference to this figure, the key which is formed of a piece of flat metal is relatively narrow or reduced at its central portion 10 and is gradually flared or widened toward the opposite ends to produce the enlarged sections 11 and 12. The upper and lower edges of the end section 12 are beveled downwardly and outwardly as at 13 and 14 to fit beneath the undercut or dove-tail flanges 5 and 6 when the key is in the channel of the nut, while the widened end portion 11 of the key is formed with a concaved, beveled upper edge 15 and a lower beveled edge 16, the latter terminating in a depending spur 17, the knife edge 18 of which projects below the bottom face of the nut and is adapted to bite into the beam or bar A when the key is driven home.

From the above description, taken in connection with the accompanying drawings, the manner of employing the lock nut shown will be readily understood. The key is seated in the channel in the side of the nut and pushed along the same until the center of the key indicated by the line *a* in Fig. 4 and which line *a* may be placed for convenience, is brought into alinement with the indicating marks *b—b* on the flanges 5 and 6. At this time the top flange 5 will just contact with the concave or curved bevel edge of the flared or widened end portion 11 of the key. In order to lock the nut the key is now struck to drive it inward along the groove until the opposite ends of the key are flush with the opposite side faces of the nut, that is to say until the key fully occupies the groove as the key is driven home, the top flange 5 bearing against the curved beveled edge of the section 11 will gradually force the spur end of the key downward against the beam A and the spur will bite or cut into the body of the beam until when the key is completely driven home the nut will be locked or wedged firmly to the bar or beam A. To remove the nut it is only necessary to strike the key from the opposite end, that is to drive it out of the channel of the nut.

What I claim is:

In a nut lock, the combination with a bolt, of a nut therefor having a channel in one side thereof, an undercut flange at the top of the channel extending entirely across the face of the nut, a second undercut flange at the bottom of the channel but terminating short of one of the side edges of the nut, a wedging key formed with a top concaved bevel edge adapted when the key is driven home to bear against the upper flange, and a spur formed on said key and adapted to be pressed into the body through which the bolt is passed as the flange bears against the concaved beveled surface of the key when the latter is driven home.

In testimony whereof, I affix my signature, in the presence of two witnesses.

LEVI G. CHANNELL.

Witnesses:
H. B. RADY,
EVA THORN.

Copies of this patent may be obtained for five cents each, by addressing the "Commissioner of Patents, Washington, D. C."